US011165506B2

(12) United States Patent
Hiller

(10) Patent No.: US 11,165,506 B2
(45) Date of Patent: Nov. 2, 2021

(54) DRONE NETWORK AND METHOD OF OPERATING

(71) Applicant: The Boeing Company, Chicago, IL (US)

(72) Inventor: Nathan D. Hiller, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/745,438

(22) Filed: Jan. 17, 2020

(65) Prior Publication Data
US 2021/0226708 A1 Jul. 22, 2021

(51) Int. Cl.
*H04B 10/114* (2013.01)
*H04B 10/564* (2013.01)
*H04B 10/50* (2013.01)

(52) U.S. Cl.
CPC ......... *H04B 10/564* (2013.01); *H04B 10/114* (2013.01); *H04B 10/505* (2013.01); *H04B 10/1143* (2013.01)

(58) Field of Classification Search
None
See application file for complete search history.

(56) References Cited

U.S. PATENT DOCUMENTS

| | | | | |
|---|---|---|---|---|
| 4,995,101 A * | 2/1991 | Titterton | ................. | H04B 10/11 342/45 |
| 5,528,409 A * | 6/1996 | Cucci | .................. | H04B 10/807 398/113 |
| 6,043,920 A * | 3/2000 | Leopold | ................. | H04B 10/11 398/185 |
| 6,141,763 A * | 10/2000 | Smith | ...................... | G06F 1/266 709/200 |
| 6,285,481 B1 * | 9/2001 | Palmer | ................. | H04B 10/118 398/119 |
| 6,504,634 B1 * | 1/2003 | Chan | .................. | H04B 10/1125 398/129 |
| 6,643,467 B1 * | 11/2003 | Presby | ............... | H04B 10/1121 385/31 |

(Continued)

OTHER PUBLICATIONS

Chen et al., A Novel Energy Harvesting Scheme for Mixed FSO-RF Relaying Systems, 2019, IEEE (Year: 2019).*

(Continued)

*Primary Examiner* — Jai M Lee
(74) *Attorney, Agent, or Firm* — Armstrong Teasdale LLP

(57) ABSTRACT

A drone network including a first drone including a first receiver, a first transmitter, and a first processor, and a second drone positionable at a distance from the first drone. The second drone includes a second receiver, a second transmitter, and a second processor. The first transmitter is configured to emit a signal towards the second drone for reception at the second receiver, and the second processor is configured to determine a minimum signal power for the signal to be processed at the second drone. The second transmitter is configured to emit a return signal towards the first drone for reception at the first receiver. The return signal contains minimum signal power data as determined by the second processor, and the first processor is configured to modulate the power of signals to be emitted towards the second drone from the first transmitter based on the minimum signal power data.

20 Claims, 5 Drawing Sheets

(56) References Cited

U.S. PATENT DOCUMENTS

| | | | |
|---|---|---|---|
| 8,554,086 B2* | 10/2013 | Ann | H04B 10/116 398/197 |
| 8,788,119 B2 | 7/2014 | Tillotson et al. | |
| 10,009,119 B1* | 6/2018 | Hiller | H02J 50/001 |
| 10,411,797 B1* | 9/2019 | Mitchell | H04B 10/2581 |
| 2003/0060171 A1* | 3/2003 | Lovberg | H04B 10/1149 455/73 |
| 2003/0066947 A1* | 4/2003 | Alwan | H04B 10/1123 250/206 |
| 2003/0090765 A1* | 5/2003 | Neff | H04B 10/1127 398/126 |
| 2004/0141752 A1* | 7/2004 | Shelton | H04B 10/1127 398/120 |
| 2005/0238357 A1* | 10/2005 | Farrell | H04B 10/1123 398/119 |
| 2005/0261018 A1* | 11/2005 | Yamamoto | H04W 52/242 455/522 |
| 2006/0018661 A1* | 1/2006 | Green | H04B 10/1127 398/128 |
| 2007/0003280 A1* | 1/2007 | Sada | H04B 10/07955 398/27 |
| 2010/0133436 A1* | 6/2010 | Rosener | H04B 10/1143 250/339.06 |
| 2014/0021799 A1* | 1/2014 | Sankararamalingam | H04B 5/0037 307/104 |
| 2014/0270749 A1* | 9/2014 | Miniscalco | H04B 10/038 398/5 |
| 2014/0287681 A1* | 9/2014 | Ollikainen | H04B 10/807 455/41.1 |
| 2014/0376914 A1* | 12/2014 | Miniscalco | H04B 7/18504 398/58 |
| 2015/0171961 A1* | 6/2015 | Featherston | H04B 10/07955 398/38 |
| 2017/0093228 A1* | 3/2017 | Fisher | H02J 7/025 |
| 2017/0355461 A1* | 12/2017 | Naito | G05D 1/12 |
| 2018/0138748 A1* | 5/2018 | Adolf | H02J 7/00045 |
| 2020/0067604 A1* | 2/2020 | Hiller | H04B 10/80 |

OTHER PUBLICATIONS

Diamantoulakis et al., Airborn Radio Access Networks with Simultaneous Light Information and Power Transfer (SLIPT), 2018, IEEE (Year: 2018).*

Wikipedia, Retroreflector, 2018 (Year: 2018).*

"Drone Energy Sources—Pushing the Boundaries of Electric Flight"; Drone Industries Insights; created Jun. 6, 2017 by Team DRONEII.com; available at https://www.droneii.com/drone-energy-sources; last visited Jan. 28, 2020; 12 pp.

Heimbuch, Jaymi; "Drones to be Power Plants in the Sky, Beam Energy Back to Earth"; Nov. 25, 2013; available at https://www.treehugger.com/clean-technology/drones-power-plants-sky-beam-energy-back-earth.html; last visited Jan. 28, 2020; 2 pp.

"A Simple Approach for Harvesting Energy from Indoor Lighting"; Digi-Key Electronics; Jun. 20, 2017; available at https://www.digikey.com/en/articles/techzone/2017/jun/a-simple-approach-for-harvesting-energy-from-indoor-lighting; last visited Jan. 28, 2020, 8 pp.

Anton, Steven R.; Energy Harvesting for Unmanned Aerial Vehicles, Center for Intelligent Material Systems and Structures, pp. 1-10.

Banerjee, Abhijett et al., Future of Mobile Software for Smartphones and Drones: Energy and Performance, IEEE/ACM 4th Conference on Mobile Software Engineering and Systems (MOBILESoft), 2017; pp. 1-12.

* cited by examiner

DRONE NETWORK AND METHOD OF OPERATING

FIELD

The field relates generally to unmanned aerial vehicles and, more specifically, to systems and methods of efficiently managing energy use in a drone network.

BACKGROUND

Unmanned aerial vehicles, such as flying drones, have been used to perform communications, delivery, and/or reconnaissance and surveillance tasks. To perform the tasks, the aerial vehicles may be grouped in an interconnected and at least semi-autonomous "swarm." The swarm may include multiple vehicles that are in communication with each other to coordinate drone operations and movement while performing the tasks. Each vehicle may be equipped with communications equipment, and one or more vehicles in the swarm may be equipped with a payload for performing certain tasks. In addition, flying vehicles typically use a propeller-based propulsion system to maintain flight and to travel to and/or from a target location. At least some known aerial vehicles facilitate the communication, task performance, and propulsion operations by drawing power from a battery that is onboard the vehicle. Among other problems with known networks, the battery has a finite power supply, which limits the ability of the swarm to perform tasks for extended periods of time.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect is a drone network. The network includes a first drone including a first receiver, a first transmitter, and a first processor, and a second drone positionable at a distance from the first drone. The second drone includes a second receiver, a second transmitter, and a second processor. The first transmitter is configured to emit a signal towards the second drone for reception at the second receiver, and the second processor is configured to determine a minimum signal power for the signal to be processed at the second drone. The second transmitter is configured to emit a return signal towards the first drone for reception at the first receiver. The return signal contains minimum signal power data as determined by the second processor, and the first processor is configured to modulate the power of signals to be emitted towards the second drone from the first transmitter based on the minimum signal power data.

Another aspect is a drone. The drone includes a receiver subsystem configured to receive a signal, and a processor configured to determine a minimum signal power for the signal to be processed at the drone. The processor is also configured to determine an excess signal power contained in the signal based on a difference between a power of the signal and the minimum signal power. The drone also includes an energy collection subsystem configured to collect and store the excess signal power.

Yet another aspect is a method of controlling operation of a drone network. The method includes emitting a first signal from a first drone, receiving the signal at a second drone in the network, determining, at the second drone, a minimum signal power for the signal to be processed at the second drone, emitting, from the second drone to the first drone, a return signal that contains minimum signal power data as determined at the second drone, and emitting a second signal from the first drone to the second drone, wherein the power of the second signal is modulated based on the minimum signal power data.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
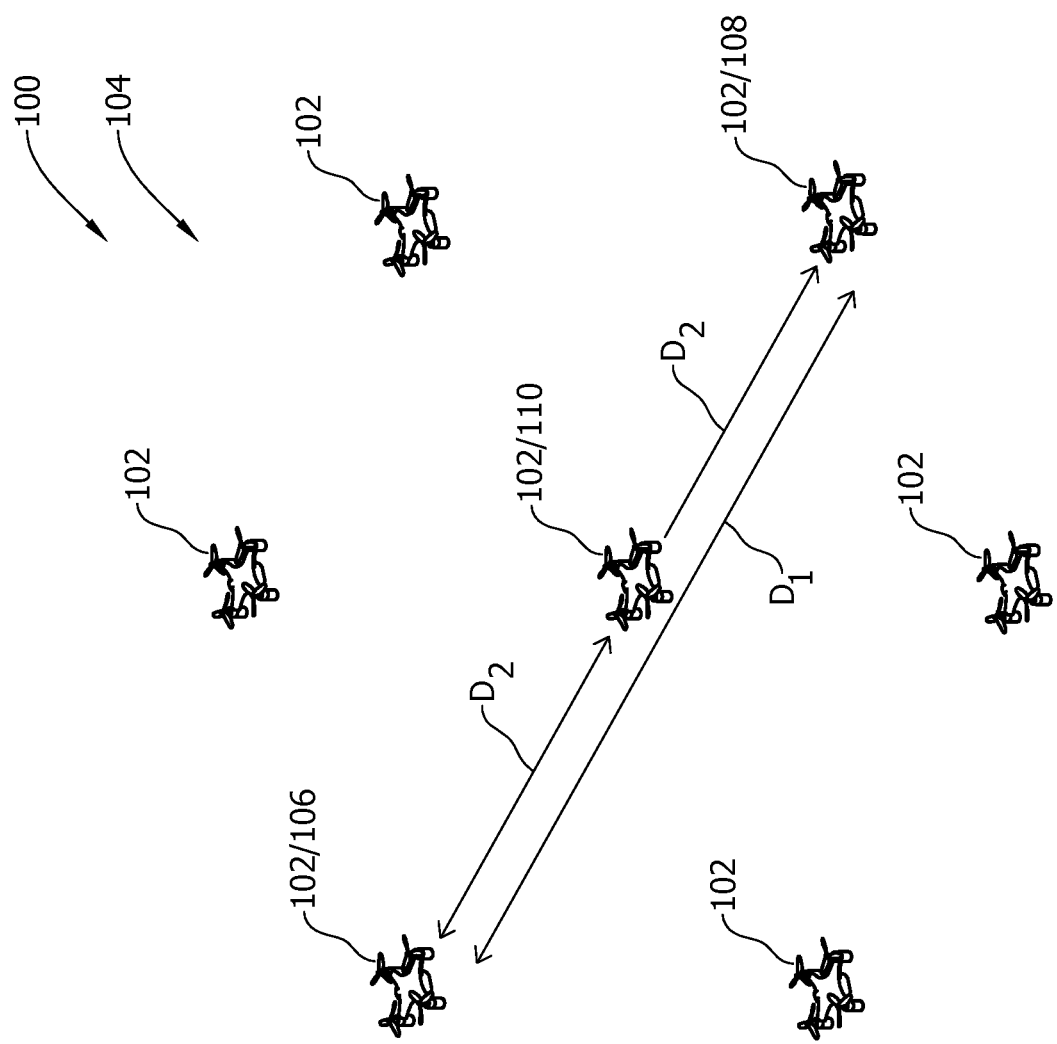
FIG. 1 is an illustration of an example drone network.

Examples described below include systems and methods for efficiently managing energy use in a drone or drone network. As used herein, the term "drone" refers to an unmanned aerial vehicle that is either autonomous or remotely piloted. Drones in the network may be relatively small, bee-sized or handheld drones having a power consumption of about 10 Watts. The drones are typically spaced from each other as the "swarm" either remains stationary over a target location or travels to/from the target location. For example, a first drone at an outer edge of the swarm may be positioned a first distance from a second drone at an opposing outer edge of the swarm, and may be positioned a lesser second distance from a third drone interiorly located within the swarm. In one example, drones in the network use a laser communication system to facilitate high data rate communication with each other for coordinating drone movements and tasks, for example. As described herein, operation of the drones may be dynamically adjustable to conserve power when performing communication operations, and to store excess power derived from signals transmitted between drones in the network, or from signals received from ground-based systems.

For example, systems and methods described facilitate transmitting signals between drones in the network, such as the first drone to the second, third and/or successive drones, in an energy efficient manner. In one example, the first drone has a transmitter subsystem that transmits a signal to at least the second drone. The first drone also has a receiver subsystem that receives a return signal from the second drone. The return signal contains data that enables the first drone to modulate its signal transmission power to a minimum signal power that is just high enough to be processed at the second drone. Accordingly, the first drone conserves energy and battery life by transmitting signals at the minimum signal power that is no greater than necessary for communicating with the second drone. However, the third drone is positioned the lesser second distance from the first drone such that the modulated signals are received at the third drone with excess signal power. Accordingly, the third drone includes an energy collection subsystem that collects and stores the excess signal power in the third drone. The drones may be repositioned relative to each other to facilitate balancing the power consumption load and the energy collection potential across the swarm. Thus, the drones work together to enhance the operational capabilities of the swarm, and to improve data transmission security by maintaining a broadcast area within the physical space defined by the swarm.

As used herein, an element or step recited in the singular and preceded with the word "a" or "an" should be understood as not excluding plural elements or steps, unless such exclusion is explicitly recited. Furthermore, references to "example", "example implementation" or "one implementation" of the present disclosure are not intended to be interpreted as excluding the existence of additional implementations that also incorporate the recited features.

FIG. 1 is an illustration of an example drone network 100. In the example implementation, network 100 includes a plurality of drones 102, defining a swarm 104, that can move independently of each other within or outside of swarm 104, and/or that can be moved synchronously with each other in coordinated movements. Drones 102 are wirelessly communicatively coupled with each other to facilitate and coordinate the movement of individual drones 102 within swarm 104. In addition, at least some drones 102 may be spaced at different distances from each other within swarm 104. For example, drones 102 may include a first drone 106, a second drone 108 spaced a first distance $D_1$ from first drone 106, and a third drone 110 spaced a lesser second distance $D_2$ from first drone 106 and second drone 108.

First drone 106 and second drone 108 may be positioned at opposing peripheral edges of swarm 104 such that second drone 108 is the farthest positioned drone 102 from first drone 106 in swarm 104. To effectively communicate between first drone 106 and second drone 108, signals transmitted therebetween have a signal power greater than a threshold power level. Drones 102 positioned a lesser distance from first drone 106 than second drone 108 may also be an intended or unintended recipient of the signals transmitted from first drone 106 to second drone 108. However, due to the proximity of the other drones 102 to first drone 106, signals transmitted from first drone 106 to second drone 108 may contain excess signal power when received at the other drones 102, such as third drone 110. As will be described in more detail below, excess power contained in the signals may be collected and stored by the other drones 102 to enhance the operational service time of swarm 104.

Figure 2:
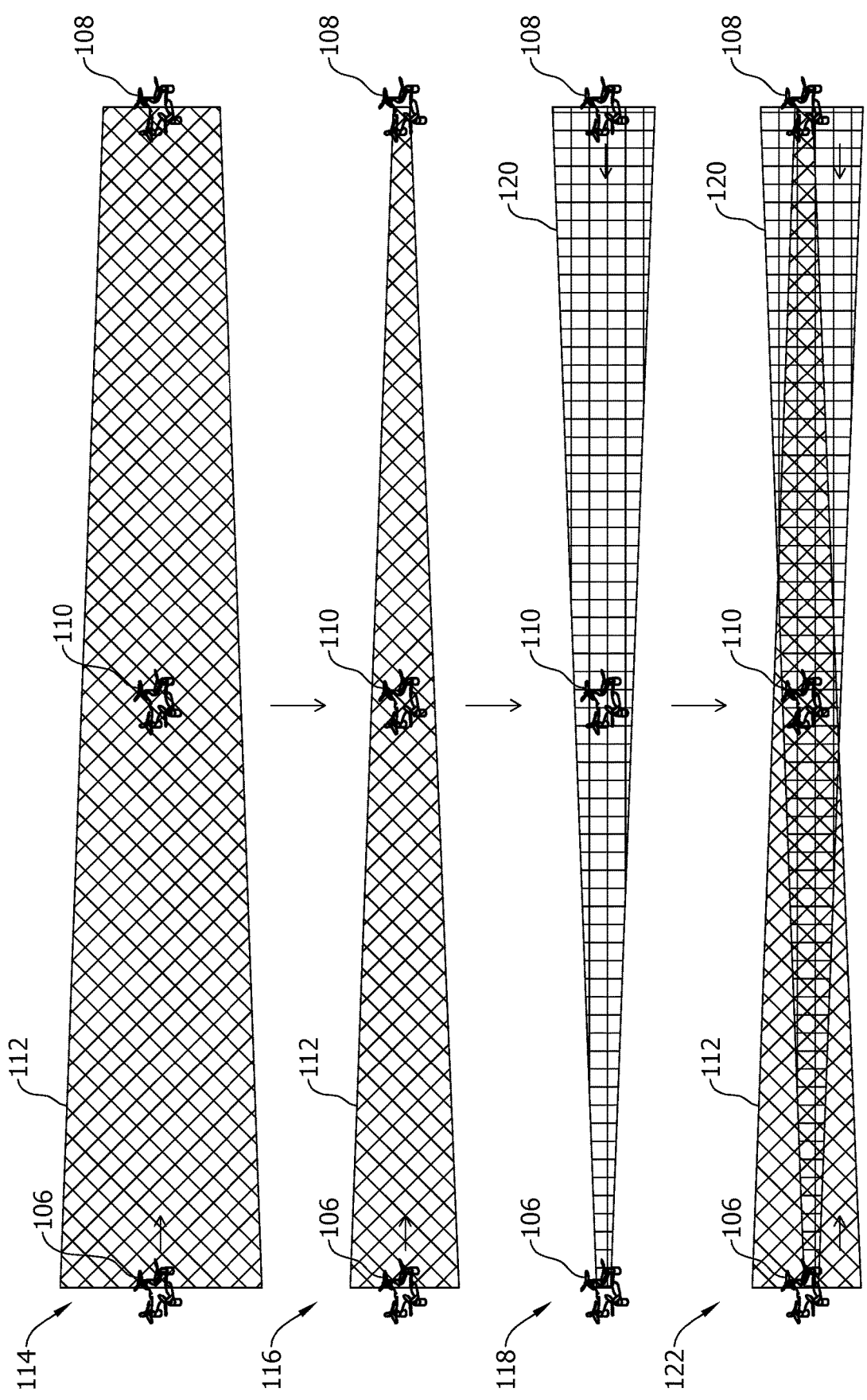
FIG. 2 is a flow diagram illustrating an example method of managing energy use in the network shown in FIG. 1.

FIG. 2 is a flow diagram illustrating an example method of managing energy use in network 100 (shown in FIG. 1). In the example implementation, first drone 106 emits a first signal 112 therefrom for reception at second drone 108. Second drone 108 analyzes first signal 112 to determine a minimum signal power (i.e., the threshold power level) for signals emitted from first drone 106 to be processed at second drone 108. For digital signals, the ability of second drone 108 to process signals, and thus to determine the minimum signal power and potentially excess power in the signals, is based at least partially on an ability the second drone 108 to decipher bits of a bit stream that define the signals. For example, a processor (shown in FIG. 4) of second drone 108 may analyze the signals to determine a bit error rate, and the bit error rate may be compared to a threshold value (i.e., a minimum signal bit error rate). If the determined bit error rate exceeds the threshold value, the minimum signal power is verified and excess signal power may be present. For analog signals, the ability of second drone 108 to process signals is based at least partially on the spurious free dynamic range (SFDR) of the signals. For example, minimum signal power may be determined to be at the lower end of the SFDR, and excess signal power may be determined to be present at any power level greater than the lower end of the SFDR.

In one example, first drone 106 emits first signal 112 having a fading power level to facilitate determining the minimum signal power. For example, in a first process step 114 illustrated in FIG. 2, first drone 106 emits first signal 112 having a first signal power that is greater than the minimum power required for first signal 112 to be processed at second drone 108. Valuable power reserves in first drone 106 may be depleted at an inefficient rate if first drone 106 continued to emit first signal 112 at the first signal power. In addition, emitting first signal 112 at a signal power greater than that is necessary to be processed at second drone 108 may carry first signal 112 outside of network 100 for reception by unsecure and unintended third party recipients. Accordingly, from first process step 114 to a second process step 116, the signal power of first signal 112 is progressively reduced from the first signal power to a second signal power. In the example implementation, the fading power level of first signal 112 is monitored at second drone 108, and second drone 108 analyzes the fading power level to determine the minimum signal power for first signal 112 to be processed at second drone 108.

In a third process step 118, second drone 108 emits a return signal 120 towards first drone 106. Return signal 120 contains minimum signal power data, which provides first drone 106 with information on the power level for emitting first signal 112 towards second drone 108 that enables first signal 112 to be processed at second drone 108. Return signal 120 may be emitted towards first drone 106 at the minimum signal power. First drone 106 receives return signal 120 and modulates the power of signals to be emitted towards second drone 108 based on the minimum signal power data. Accordingly, in a fourth process step 122, effective and power-saving communication is established between first drone 106 and second drone 108. Specifically, first signals 112 and return signals 120 are transmitted between first drone 106 and second drone 108 at the minimum signal power to facilitate conserving the energy of first drone 106 and second drone 108.

In the example implementation, third drone 110 is positioned between first drone 106 and second drone 108 throughout the process steps 114, 116, 118, and 122. In operation, third drone 110 analyzes first signal 112 and return signal 120 to determine a minimum signal power for signals emitted from first drone 106 and second drone 108 to be processed at third drone 110. Because third drone 110 is positioned the lesser second distance $D_2$ (shown in FIG. 1) from first drone 106 and second drone 108, the minimum signal power for processing first signal 112 and return signal 120 at third drone 110 is less than the minimum signal power for processing first signal 112 at second drone 108, for example. Accordingly, third drone 110 may determine first signal 112 and return signal 120 contain excess signal power when received at third drone 110. The excess signal power may be determined based on a difference between the power of first signal 112 and return signal 120 as received at third drone 110, and the minimum signal power for processing the signals at third drone 110. Accordingly, third drone 110 may collect and store the excess signal power to enhance its operational capabilities and service life.

Figure 3:
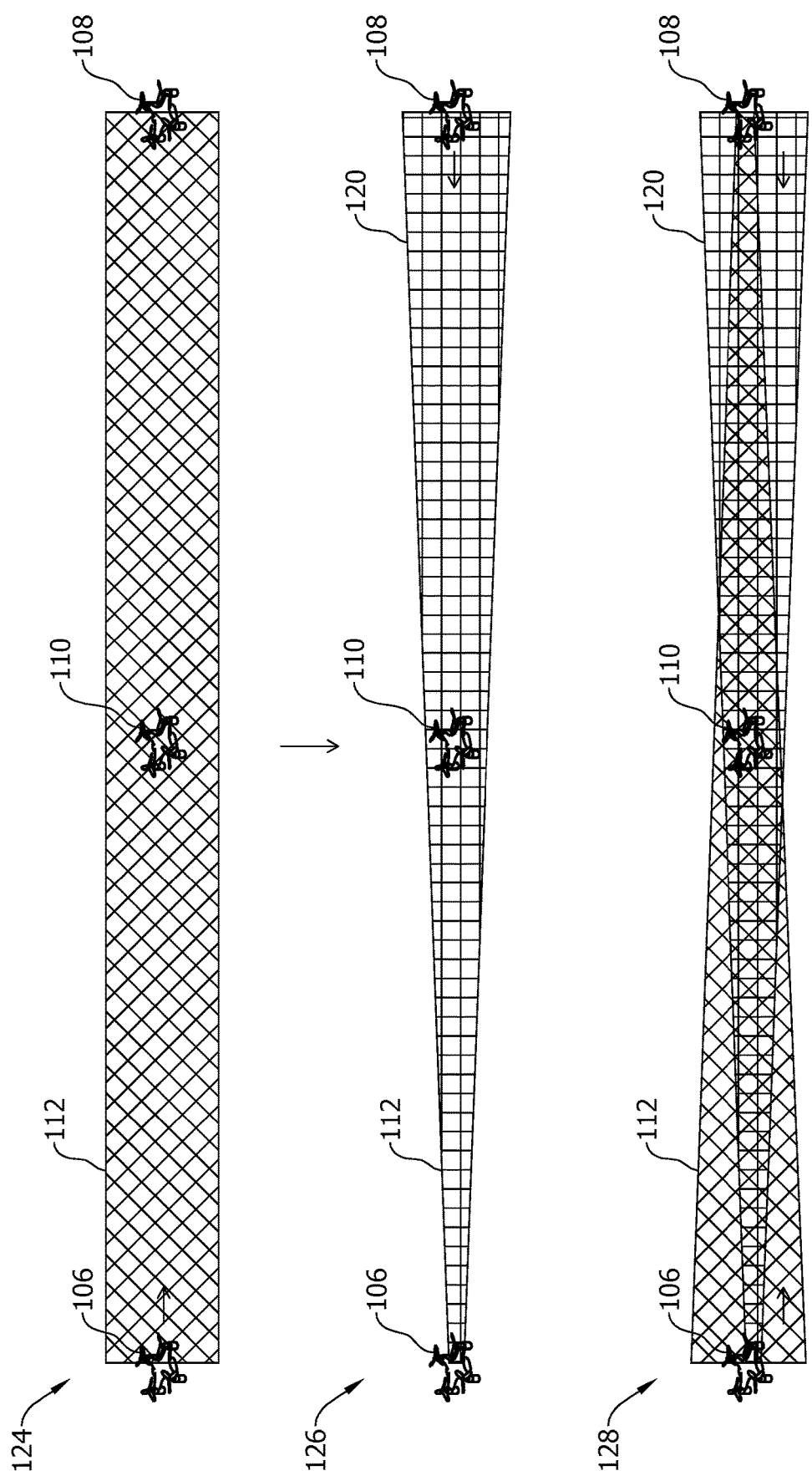
FIG. 3 is a flow diagram illustrating an alternative method of managing energy use in the network shown in FIG. 1.

FIG. 3 is a flow diagram illustrating an alternative method of managing energy use in network 100 (shown in FIG. 1). As described above, second drone 108 analyzes first signal 112 emitted from first drone 106 to determine a minimum signal power for signals emitted from first drone 106 to be processed at second drone 108. In the example implementation, first drone 106 emits first signal 112 having a fixed power level to facilitate determining the minimum signal power. For example, in a first process step 124 illustrated in FIG. 3, first drone 106 emits first signal 112 having a signal power that is greater than the minimum power required for first signal 112 to be processed at second drone 108. Second drone 108 then attenuates the power level of first signal 112 by an attenuation value. The attenuation value is determined based on a difference between the minimum signal power and a power of first signal 112 as received at second drone 108. In a second process step 126, second drone 108 emits return signal 120 towards first drone 106. Return signal 120 contains minimum signal power data including the attenuation value determined by second drone 108. First drone 106 receives return signal 120 and modulates the power of signals to be emitted towards second drone 108 based on the minimum signal power data, such as modulating the power of the signals proportionally with the attenuation value. Accordingly, in a third process step 128, effective and power-saving communication is established between first drone 106 and second drone 108. Specifically, first signals 112 and return signals 120 are transmitted between first drone 106 and second drone 108 at the minimum signal power to facilitate conserving the energy of first drone 106 and second drone 108.

In the examples illustrated in FIGS. 2 and 3, the signal power emitted from first drone 106 may also be increased to determine the minimum signal power if interference, for example, restricts the ability of second drone 108 to process signal 112.

Referring again to FIG. 1, drones 102 in swarm 104 can move independently of each other within or outside of network 100, and/or can be moved synchronously with each other in coordinated movements. For example, swarm 104 can be positioned at a fixed location relative to the earth as drones 102 are moved relative to each other. Alternatively, swarm 104 can be moved at a velocity relative to the earth as drones 102 are moved relative to each other. In either example, drones 102 may be moved relative to each other to facilitate balancing the power consumption load and the energy collection potential across swarm 104.

For example, in the swarm configuration illustrated in FIG. 1, first drone 106 may have a greater power consumption load than third drone 110 as a result of the need for first drone 106 to use more power to effectively communicate with second drone 108 than with third drone 110. As such, first drone 106 may be moved inward from its position at the peripheral edge of swarm 104, thereby reducing a distance of first drone 106 relative to other drones 102 in swarm 104 and reducing an amount of power for effectively communicating with the other drones 102. In one example, first drone 106 may be moved to a relative center of swarm 104 after being positioned at the peripheral edge for a preset amount of time, or based on an analysis of remaining battery life of first drone 106.

In another example, first drone 106 and third drone 110 may switch relative positions within swarm 104 such that third drone 110 moved from the relative center of swarm 104 to the peripheral edge of swarm 104. During operation of swarm 104 and up to the time of the position switching, third drone 110 has used less transmission power and has also collected power from other drones 102. Accordingly, moving first drone 106 and third drone 110 relative to each other also facilitates balancing the power consumption load and the energy collection potential across swarm 104.

While the above description has been discussed in the context of drones 106, 108, and 110, it should be understood that the receiving, analyzing, power modulating, and transmitting processes may be performed by all drones 102 in network 100 simultaneously to facilitate managing energy conservation.

Figure 4:
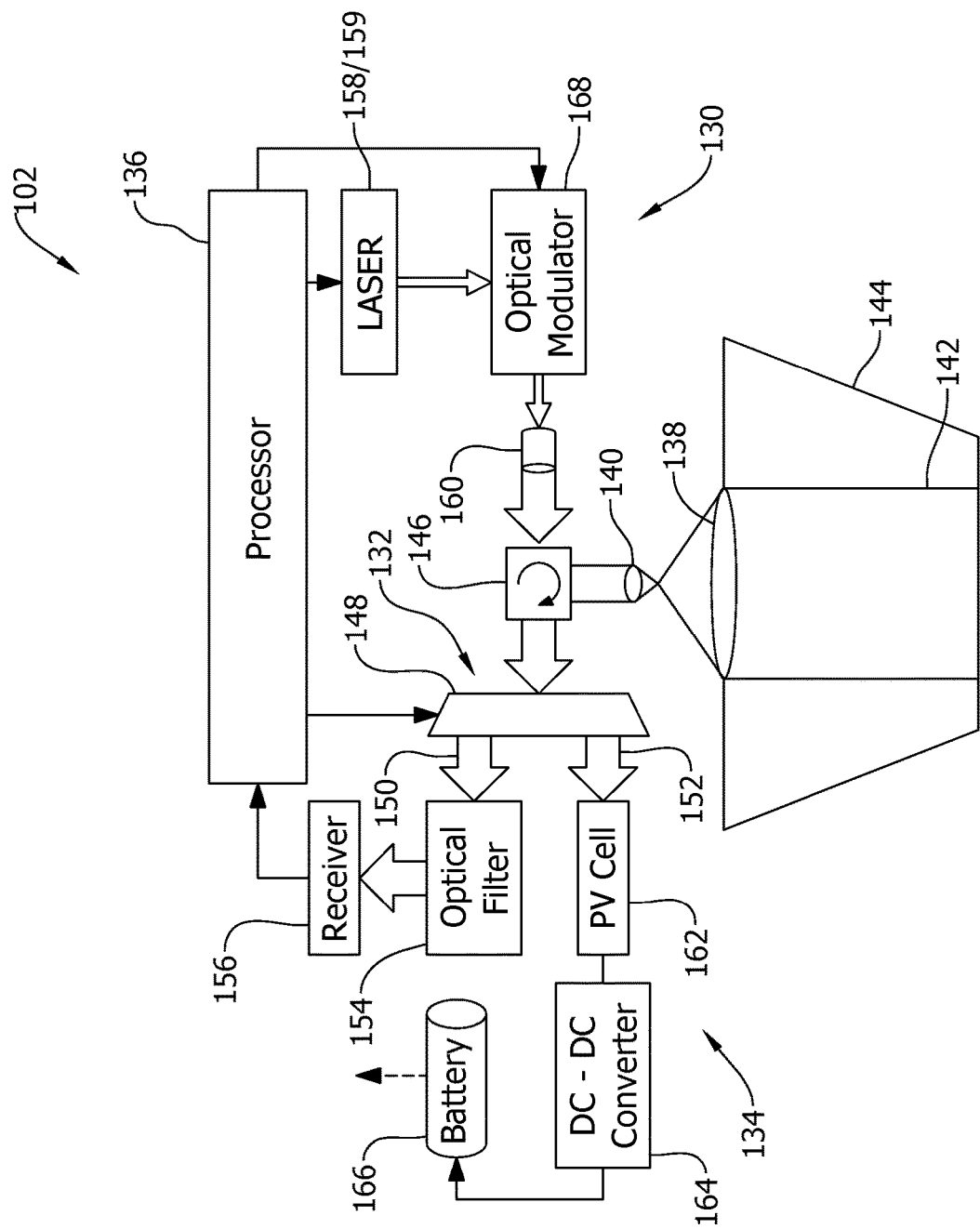
FIG. 4 is a schematic illustration of internal components of a drone that may be used in the network shown in FIG. 1.

FIG. 4 is a schematic illustration of internal components of a drone 102 that may be used in network 100 (shown in FIG. 1). In the example implementation, drone 102 includes a transmitter subsystem 130, a receiver subsystem 132, an energy collection subsystem 134, and a processor 136. The subsystems 130, 132, and 134 may share one or more components between each other. Accordingly, drone 102 includes a collection lens 138 and a culminating lens 140 for emitting outgoing signals 142, and for receiving incoming signals 144 from other drones 102.

When in a first receiving mode, incoming signals 144 are routed through lenses 138 and 140 towards a circulator 146. Circulator 146 may be a free-space optical circulator or a fiber-based circulator 146. Circulator 146 is a passive multi-port device that enables signals to be transmitted and received from the same component. Accordingly, incoming signals 144 received at circulator 146 are routed towards a tunable beam splitter 148, which is controlled by processor 136 to determine a splitting ratio to be executed by beam splitter 148. In an alternative example, incoming signals 144 received at circulator 146 are routed towards a tunable fiber coupler (not shown). In one example, processor 136 controls beam splitter 148 to split incoming signals 144 into a first output 150 and a second output 152. First output 150 is routed towards processor 136, and second output 152 is routed towards components of energy collection subsystem 134, as will be described in more detail below.

In the example implementation, first output 150 is routed through an optical filter 154 and a receiver 156 that are positioned between beam splitter 148 and processor 136. Optical filter 154 filters noise from first output 150 of incoming signals 144, and a receiver 156. Receiver 156 may be defined by a photodiode that converts an optical signal to an electronic signal, and a electrical filter that filters electrical noise from the signal. Processor 136 then analyzes first output 150 to determine a minimum signal power for incoming signals 144 to be processed at drone 102. Transmitter subsystem 130 includes a laser emitter 158 in communication with processor 136, and a collimator 160 positioned between laser emitter 158 and lenses 138 and 140. Accordingly, in one example, processor 136 controls laser emitter 158 to transmit an outgoing signal 142 (e.g., return signal 120) that contains minimum signal power data, as described above once, once the minimum signal power has been determined. In one embodiment, laser emitter 158 is a CW $Nd^{3+}$:YAG emitter.

In an alternative example, a limited number of drones 102 in swarm 104 have a standalone laser emitter 158 installed thereon, and the remaining drones 102 have a laser emitter 158 that is a modulating retroreflector 159 installed thereon. Accordingly, the limited number of drones 102, such as a single drone 102, may be a source of laser transmissions, and the remaining drones 102 conserve energy by reflecting signals received from the source.

When in the first receiving mode, processor 136 also analyzes incoming signals 144 to determine the presence of excess signal power therein. Incoming signals 144 may be received from other drones 102 in swarm 104, or may be received from ground-based systems. If it is determined incoming signals 144 contain excess signal power, processor 136 may adjust the ratio of beam splitter 148 to enable second output 152 of incoming signals 144 to be routed towards energy collection subsystem 134. In the example implementation, energy collection subsystem 134 includes a photovoltaic (PV) cell 162, a DC-DC (power) converter 164, and a battery 166 electrically connected to power-consuming components of drone 102. In operation, photovoltaic cell 162 converts the energy of incoming signals 144 (i.e., laser transmissions) to electricity, and DC-DC converter 164 further converts the electricity for storage within battery 166. Alternatively, the output of DC-DC converter may be routed directly to energy-consuming components of drone 102.

When in a second receiving mode, drone 102 may be the recipient of incoming signals 144 that contain minimum signal power data. Incoming signals 144 may be analyzed by processor 136, and the operation of transmitter subsystem 130 adjusted accordingly to facilitate conserving battery 166. In the example implementation, transmitter subsystem 130 includes an optical modulator 168 that receives an output from laser emitter 158, and that selectively manipulates the output for generating outgoing signals 142. For example, if processor 136 determines outgoing signals 142 are being transmitted at a power level that is greater than the minimum signal power, optical modulator 168 is operable to reduce the power level of outgoing signals 142 to the minimum signal power.

Figure 5:
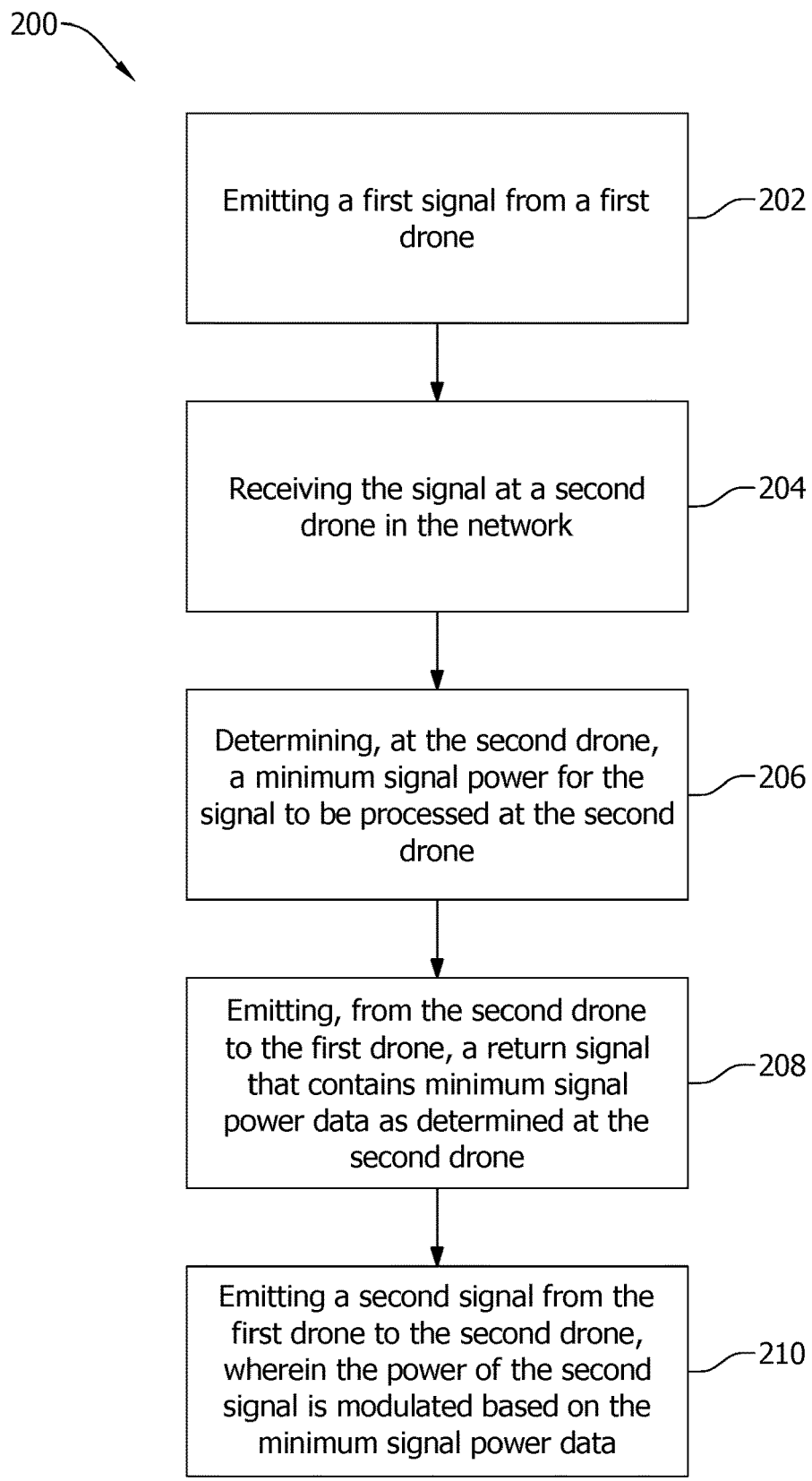
FIG. 5 is a flow diagram illustrating an example method of operating a drone network.

FIG. 5 is a flow diagram illustrating an example method 200 of operating a drone network. Method 200 includes emitting 202 a first signal from a first drone, receiving 204 the signal at a second drone in the network, determining 206, at the second drone, a minimum signal power for the signal to be processed at the second drone, emitting 208, from the second drone to the first drone, a return signal that contains minimum signal power data as determined at the second drone, and emitting 210 a second signal from the first drone to the second drone, wherein the power of the second signal is modulated based on the minimum signal power data.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art after reading this specification. Such other examples are intended to be within the scope of the claims if they have structural elements that do not differ from the literal language of the claims, or if they include equivalent structural elements with insubstantial differences from the literal language of the claims.

What is claimed is:

1. A drone network comprising:
    a first drone comprising a first receiver, a first transmitter, and a first processor; and
    a second drone positionable at a distance from the first drone, the second drone comprising a second receiver, a second transmitter, and a second processor,
    wherein the first transmitter is configured to emit a signal towards the second drone for reception at the second receiver, and the second processor is configured to determine a minimum signal power for the signal to be processed at the second drone, wherein the second transmitter is configured to emit a return signal towards the first drone for reception at the first receiver, the return signal containing minimum signal power data as determined by the second processor, and the first processor is configured to modulate the power of signals to be emitted towards the second drone from the first transmitter based on the minimum signal power data,
    wherein the second processor is further configured to determine an excess signal power contained in the signal based on a difference between the power of the signal and the minimum signal power, the second drone further comprising an energy collection subsystem configured to collect and store the excess signal power within the second drone, and
    wherein the second drone is movable to be positioned closer to the first drone based on an analysis of a remaining battery life of the second drone.

2. The network in accordance with claim 1, wherein the first transmitter is configured to emit the signal having a fading power level, and wherein the second processor is configured to monitor the fading power level to determine the minimum signal power.

3. The network in accordance with claim 1, wherein the first transmitter is configured to emit the signal having a fixed power level, and wherein the second processor is configured to generate the minimum signal power data based on an attenuation value that is determined based on a difference between a power of the signal and the minimum signal power.

4. The network in accordance with claim 1, wherein the first processor is configured to modulate the power of signals to be emitted towards the second drone to a power level approximately equal to the minimum signal power.

5. The network in accordance with claim 1 further comprising a third drone positionable a lesser distance from the first drone than the second drone, wherein the third drone comprises:
    a third receiver configured to receive the signal emitted by the first drone;
    a third processor configured to determine a minimum signal power for the signal to be processed at the third drone, and to determine an excess signal power contained in the signal based on a difference between a power of the signal and the minimum signal power; and
    an energy collection subsystem configured to collect and store the excess signal power within the third drone.

6. The network in accordance with claim 5, wherein the third drone further comprises a third transmitter configured to emit a return signal towards the first drone for reception at the first receiver, the return signal containing minimum signal power data as determined by the third processor, wherein the first processor is configured to modulate the power of signals to be emitted towards the second and third drones from the first transmitter based on an analysis of the minimum signal power data contained in the return signals.

7. A drone comprising:
    a receiver subsystem configured to receive a signal;
    a processor configured to determine a minimum signal power for the signal to be processed at the drone, configured to determine an excess signal power contained in the signal based on a difference between a power of the signal and the minimum signal power, and configured to analyze a remaining battery life of the drone; and an energy collection subsystem configured to collect and store the excess signal power, wherein the drone is movable relative to a source of the signal based on the analysis of the remaining battery life.

8. The drone in accordance with claim 7 further comprising a transmitter subsystem comprising a laser emitter and an optical modulator, at least one of which controllable by the processor, the laser emitter configured to provide an output towards the optical modulator, and the optical modulator configured to selectively modulate the power of the output to form a signal to be emitted from the drone.

9. The drone in accordance with claim 8, wherein the processor is configured to identify if there is excess signal power in the signal, and is configured to modulate, with the optical modulator, the power of the emitted signal when the excess signal power is identified.

10. The drone in accordance with claim 8, wherein the laser emitter comprises a modulating retroreflector.

11. The drone in accordance with claim 8 further comprising a circulator configured to selectively route inputs and outputs between the receiver subsystem and the transmitter subsystem.

12. The drone in accordance with claim 7 further comprising a transmitter subsystem configured to emit a return signal from the drone, the return signal containing minimum signal power data as determined by the processor.

13. The drone in accordance with claim 7, wherein the receiver subsystem comprises a beam splitter controllable by the processor, and wherein the energy collection subsystem comprises a battery, wherein the processor is configured to identify if there is excess signal power in the signal based on a first output received from the beam splitter, and, when the excess signal power is identified, is configured to direct the beam splitter to provide a second output, containing the excess signal power, to the battery.

14. The drone in accordance with claim 13, wherein the energy collection subsystem further comprises a photovoltaic cell and a power converter coupled between the beam splitter and the battery for converting the second output to storable power.

15. A method of controlling operation of a drone network, the method comprising:

emitting a first signal from a first drone;

receiving the signal at a second drone in the network;

determining, at the second drone, a minimum signal power for the signal to be processed at the second drone;

determining, at the second drone, an excess signal power contained in the signal based on a difference between the power of the signal and the minimum signal power;

storing the excess signal power within the second drone;

emitting, from the second drone to the first drone, a return signal that contains minimum signal power data as determined at the second drone; and emitting a second signal from the first drone to the second drone, wherein the power of the second signal is modulated based on the minimum signal power data; and moving the second drone closer to the first drone based on an analysis of a remaining battery life of the second drone.

16. The method in accordance with claim 15 further comprising:

receiving the signal at a third drone in the network, wherein the third drone is positionable a lesser distance from the first drone than the second drone;

storing, at the third drone, excess signal power contained in the signal emitted from the first drone;

selectively moving the first, second, and third drones relative to each other to position the second drone a lesser distance from the first drone than the third drone.

17. The method in accordance with claim 16, wherein the first, second, and third drones define a drone swarm, the method further comprising positioning the drone swarm at a fixed location relative to the earth as the first, second, and third drones are moved relative to each other.

18. The method in accordance with claim 16, wherein the first, second, and third drones define a drone swarm, the method further comprising moving the drone swarm at a velocity relative to the earth as the first, second, and third drones are moved relative to each other.

19. The method in accordance with claim 16, wherein a plurality of drones, including at least the first and second drones, define a drone swarm, the method further comprising moving the first drone to a relative center of the drone swarm.

20. The method in accordance with claim 16, wherein emitting a second signal comprises modulating the power of the second signal to a power level approximately equal to the minimum signal power.

* * * * *